United States Patent [19]

Gürs et al.

[11] Patent Number: 4,637,031
[45] Date of Patent: Jan. 13, 1987

[54] APPARATUS FOR THE GENERATION OF LASER RADIATION

[75] Inventors: Karl Gürs, Eschborn; Erich Hansen, Bad Soden, both of Fed. Rep. of Germany

[73] Assignee: Battelle-Institut e.V., Frankfurt, Fed. Rep. of Germany

[21] Appl. No.: 629,781
[22] PCT Filed: Nov. 1, 1983
[86] PCT No.: PCT/EP83/00285
§ 371 Date: Jul. 11, 1984
§ 102(e) Date: Jul. 11, 1984
[87] PCT Pub. No.: WO84/02039
PCT Pub. Date: May 24, 1984

[30] Foreign Application Priority Data
Nov. 13, 1982 [DE] Fed. Rep. of Germany ....... 3242085

[51] Int. Cl.⁴ .............................................. H01S 3/097
[52] U.S. Cl. ........................................ 372/86; 372/87; 372/61
[58] Field of Search ................... 372/86, 87, 98, 92, 372/55, 61, 83

[56] References Cited
U.S. PATENT DOCUMENTS
4,491,949 1/1985 Beck et al. ............................ 372/86
4,554,667 11/1985 Kaminski ............................... 372/86

OTHER PUBLICATIONS

Hasson et al, "Simple and Compact Photopreionization-Stabilized Excimer Lasers"; Rev. Sci. Inst. 50(12) Dec. 1979.
Vuong et al, "Stabilized TEA $CO_2$ Laser with Double Photopreionization and Low-Ionization Potential Additives"; SJQE 12(1) Jan. 1982.

Primary Examiner—Leon Scott, Jr.
Attorney, Agent, or Firm—Birch, Stewart, Kolasch & Birch

[57] ABSTRACT

An apparatus for the generation of laser radiation according to the invention comprising a discharge chamber of essentially rectangular cross section made from insulating material, one pair of discharge electrodes between which a gas discharge initiated by UV preionization arising from a corona discharge can be produced in a direction transverse to an optical resonator, as well as a charging and discharging circuit and a gas circulation and cooling system. The two opposite walls of the discharge chamber on which the electrodes are arranged are provided with a metal coating, e.g. metal plates of sheets. The remaining lateral walls of the discharge chambers are provided with conducting structures, preferably wire grids which are insulated against the interior space and extend up to the level of the metal coating.

20 Claims, 5 Drawing Figures

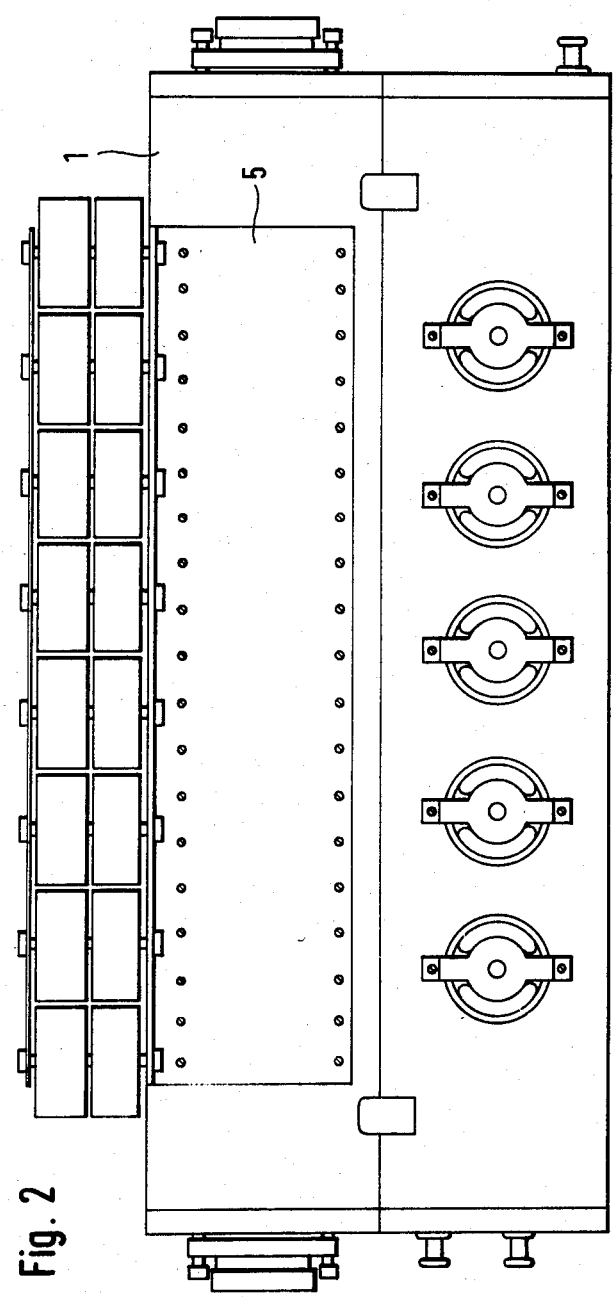

APPARATUS FOR THE GENERATION OF LASER RADIATION

The present invention relates to an apparatus for the generation of laser radiation consisting of a discharge chamber of essentially rectangular cross section made from insulating material, one pair of discharge electrodes between which a gas discharge initiated by UV preionization arising from a corona discharge can be produced in a direction transverse to the optical resonator; as well as a charging and discharging circuit and a gas circulation and cooling system.

Transversely excited pulsed lasers operate preferably at atmospheric pressure and are known as TEA (transversely excited atmospheric pressure) lasers. These lasers have a high efficiency and good radiation properties, provided that the excitation covers the whole volume between the electrodes and does not contract into sparks. Uniform discharge can be achieved by preionization of the laser gas using double pulse discharge technics or by electron beam or UV light, the UV light originating in a corona discharge. It also known that special devices for preionization are unnecessary if metal parts of the structure are led along one electrode such that they are insulated from the electrode but have the potential of the couterelectrode (Optical Engineering 15 (1976) 17-19, H. JETTER, K. Gürs, DE-OS 31 18 868). In this case, too, a corona discharge is initiated which emits UV light. In the laser according to DE-OS 31 18 868, two electrodes are arranged opposite to each other, between which the laser gas flows. This permits laser operation at high pulse repetition frequency. The lower electrode is held by insulated rods which at the same time serve for power supply. They are mounted along the upper electrodes and have the potential of the lower electrode, thus permitting corona discharge. A drawback of this setup is the relatively high technical effort involved in the use of metal rods for mounting the second electrode and the safe insulation of the rods against the first electrode.

The aim of the present invention therefore is to develop a TEA laser of high pulse frequency which does not involve the drawbacks of conventional setups and permits preionisation by corona discharge with very low technical effort.

According to the present invention, this problem is solved by providing the two opposite walls of the discharge chamber carrying the electrodes with a metal coating and the remaining lateral walls of the discharge chamber with conducting structures which are insulated against the interior space and extend on both sides up to the level of the metal coating.

The invention is explained on the basis of the attached schematic drawings, wherein FIG. 1 shows a section of the discharge chamber provided with metal coatings and conducting structures, in a direction transverse to the resonator axis;

FIG. 2 shows a lateral view of the system with a possible arrangement of the conducting structures;

Figure 1:
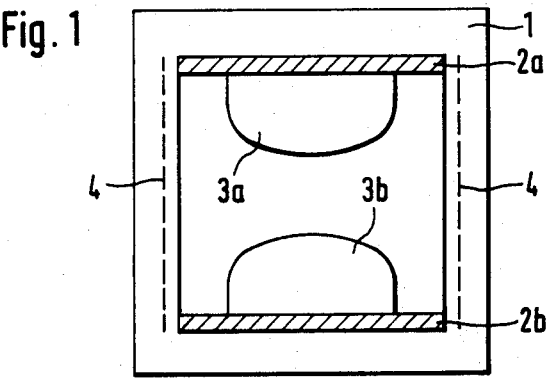

According to the invention, a laser chamber 1 with essentially square or rectangular cross section is used. Two opposite walls of the discharge chamber 1 carry metal coatings 2a and 2b, e.g. metal plates or sheets, on which the electrodes 3a and 3b are mounted.

The chamber 1 is made of an insulating material, e.g. a ceramic or a plastic material. Suitable plastics include, for example, Plexiglas, polypropylene, tetrafluoroethylene of SOLEF (PVDF). A wire grid 4 is incorporated in the lateral walls of the chamber 1 at a small distance (some millimeters) from the inner surface, which extends on both sides, i.e. upward and downward, to the level of the metal plates 2a and 2b.

It has been found that upon rapid application of a voltage to the Rogowski electrodes a corona discharge takes place in this embodiment prior to the main discharge on the surface of the lateral walls, along the wire grids 4 inside the laser chamber 1; this corona discharge emits UV light and ensures very uniform discharge.

If the discharge chamber is made from a transparent insulating material, the wire grids 4 permit observation of the gas discharge from outside. Another possibility is to replace the wire grids 4 by metal foils or plates 5, which can also be mounted on the outside, as can be seen, e.g., from the lateral view shown in FIG. 2. It should be noted, however, that the insulating layer between wire screen 4 or foil and inner surface of the wall of the discharge chamber 1 must not be too thick. For reasons of mechanical stability, it is therefore preferable to incorporate the wire screens 4 or the foils into the walls as indicated above. This also solves the problems of insulation and attachment, and the design becomes particularly simple and cheap.

Figure 3:
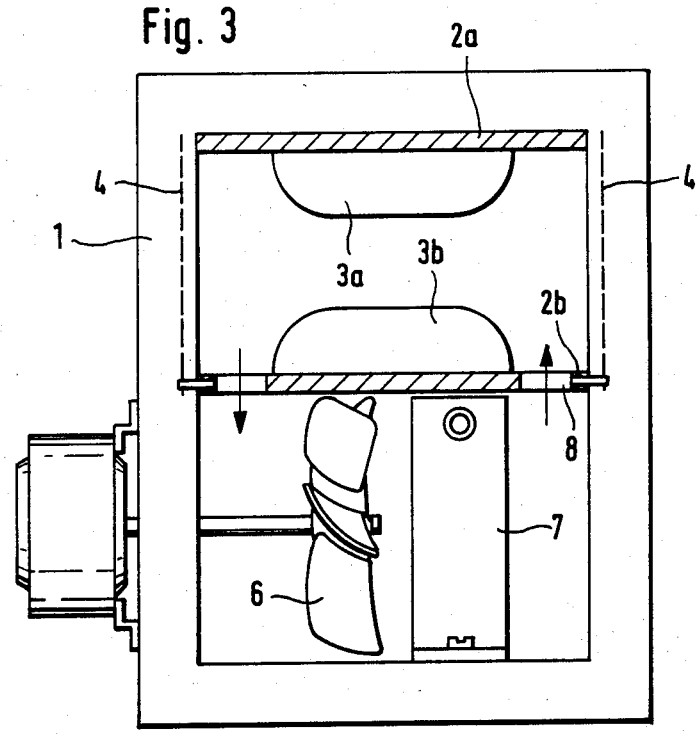
FIG. 3 shows the setup according to FIG. 1 with the adjacent gas circulation and cooling system.

In a corresponding design for high pulse frequency, the laser gas is rapidly circulated by means of fans 6 and passed through a cooler 7, as shown in FIG. 3. The gas circulation and cooling system 6 and 7 is arranged adjacent to the wall of the discharge chamber 1 which carries an electrode 3b. The arrangement of the gas circulation and cooling system is also depicted in lateral view in FIG. 2. In the region which is not covered by the electrode 3b, the partition wall with metal coating 2b is provided with openings 8 which permit the laser gas to be supplied on one side of the electrode and drawn off on the other side.

Figure 4:
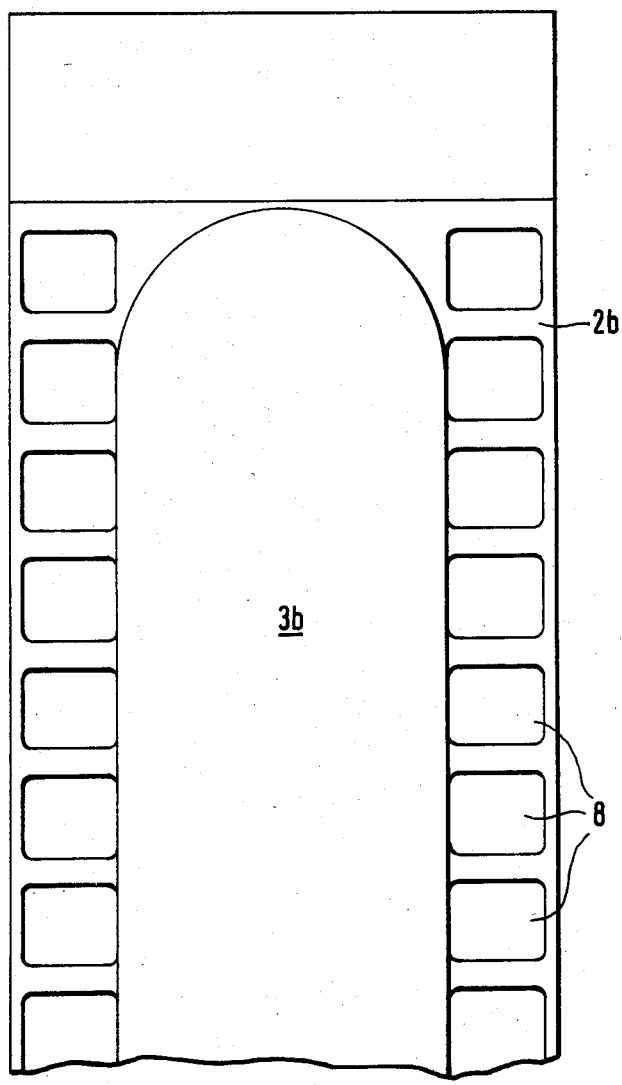
FIG. 4 shows a possible embodiment of the partition wall between the discharge chamber and the gas circulation and cooling system.

Such an embodiment is depicted in FIG. 4, which shows such openings 8 in the partition wall along the electrode 3b. Instead of a number of axial fans, it is also possible to use a radial fan of appropriate length for this application. In this case the insulating partition wall can be omitted, so that the electrode is carried alone by metal plate 2a which serves as partition. To increase the corona discharge, a conducting connection can be provided between the two wire grids 4 and one of the two metal plates 2b (FIG. 3).

For various applications involving high mechanical stress on the laser, it has been found useful to execute the laser part and the fan part plus cooler in modular construction. The two parts can be separated from each other by loosening clamps. This version of the present invention makes maintenance particularly easy.

Figure 5:
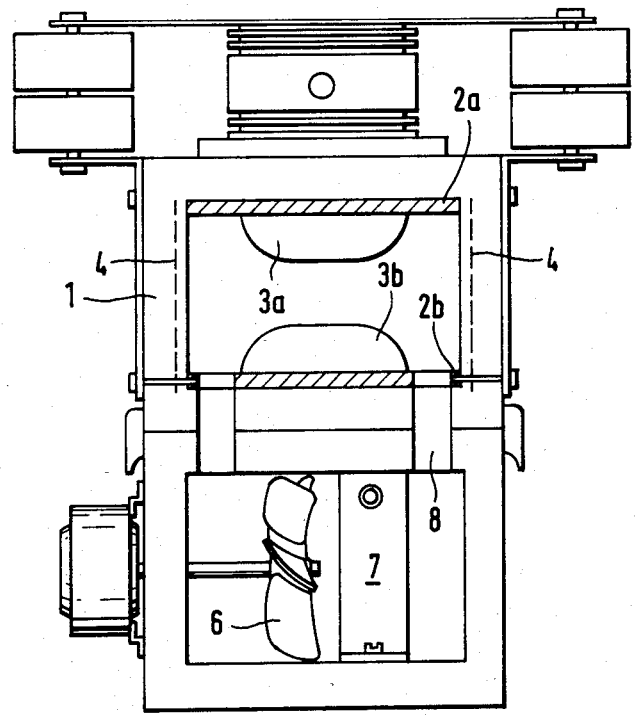
FIG. 5 shows another embodiment where the gas circulation and cooling system and the discharge chamber form two separate gas-tight connected units.

FIG. 5 shows a laser of this type with discharge capacitors and spark gap for initiating the gas discharge in the cross section. Because of the symmetrical design of the laser chamber, the capacitors and the spark gap can be arranged symmetrically. This results in a discharge circuit of low inductivity and a very short discharge time. These facts also contribute to the very homogeneous gas discharge of the laser according to the invention, which in turn results in high reproducibility of the pulses that are generated and in correspondingly good radiation properties.

It is, of course, not necessary that the laser chamber and the chamber for fan and cooler are of equal size. The relative sizes have to be adapted to the respective requirements (pulse frequency or flow velocity and cooling capacity as well as gas volume).

We claim:

1. An apparatus for the generation of laser radiation consisting essentially of
a discharge chamber made from an insulating material, said discharge chamber having two opposite walls and two lateral walls made from an insulating material which enclose an interior space containing an optical resonator, said opposite walls being provided with metal coatings on which two discharge electrodes are mounted, said discharge chamber being provided with conducting structures which are insulated from the interior space and extend between said two discharge electrodes on both sides thereof and between the levels of the metal coatings in said opposite walls, whereby by means of said discharge electrodes and conducting structures a gas discharge can be produced transverse to the optical resonator initiated by UV preionization arising from a corona discharge characterized in that the conducting structures are arranged on or within both the lateral walls of the discharge chamber and are insulated from the interior space by said lateral walls of the discharge chamber and wherein a gas circulation and cooling system are disposes in a chamber arranged adjacent to one of said opposite walls said opposite wall adjacent to the chamber containing the gas circulation and cooling system being provided with openings through which the laser gas flows.

2. The apparatus as claimed in claim 1, wherein the metal coating consists of metal plates or sheets.

3. The apparatus as claimed in claim 2, wherein a conducting connection exists between the two conducting structures and one of the two metal coatings.

4. The apparatus as claimed in claim 2, wherein wire grids are used as conducting structures.

5. The apparatus as claimed in claim 2, wherein metal plates, sheets, or foils are used as conducting structures.

6. The apparatus as claimed in claim 2, wherein the conducting structures are embedded in the lateral walls of the discharge chamber at a distance from the inner surface of the discharge chamber which is sufficient for insulation.

7. The apparatus as claimed in claim 2, wherein the conducting structures are mounted on the outside of the discharge chamber.

8. The apparatus as claimed in claim 1, wherein a conducting connection exists between the two conducting structures and one of the two metal coatings.

9. The apparatus as claimed in claim 8, wherein wire grids are used as conducting structures.

10. The apparatus as claimed in claim 8, wherein metal plates, sheets or foils are used as conducting structures.

11. The apparatus as claimed in claim 8, wherein the conducting structures are embedded in the lateral walls of the discharge chamber at a distance from the inner surface of the discharge chamber which is sufficient for insulation.

12. The apparatus as claimed in claim 1, wherein wire grids are used as the conducting structures.

13. The apparatus as claimed in claim 12, wherein the conducting structures are embedded in the lateral walls of the discharge chamber at a distance from the inner surface of the discharge chamber which is sufficient for insulation.

14. The apparatus as claimed in claim 1, wherein metal plates, sheets or foils are used as the conducting structures.

15. The apparatus as claimed in claim 14, wherein the conducting structures are embedded in the lateral walls of the discharge chamber at a distance from the inner surface of the discharge chamber which is sufficient for insulation.

16. The apparatus as claimed in claim 1, wherein the conducting structures are embedded in the lateral walls of the discharge chamber at a distance from the inner surface of the discharge chamber which is sufficient for insulation.

17. The apparatus as claimed in claim 1, wherein the conducting structures are mounted on the outside of the discharge chamber.

18. The apparatus as claimed in claim 1, wherein the chamber wall of insulating material which carries an electrode is omitted and wherein the partition wall is formed by the metal plate or the metal sheet.

19. The apparatus as claimed in claim 1, wherein the discharge chamber and the gas circulation and cooling system chamber form two separate gas-tight connected units.

20. The apparatus of claim 1 wherein the discharge chamber has a substantially rectangular configuration.

* * * * *